United States Patent [19]
Nilsson

[11] Patent Number: 6,109,248
[45] Date of Patent: Aug. 29, 2000

[54] ENGINE

[76] Inventor: Nils-Johan Nilsson, Parkgatan 10, 832 42 Frösön, Sweden

[21] Appl. No.: 09/223,371

[22] Filed: Dec. 30, 1998

[30] Foreign Application Priority Data

Jul. 1, 1996 [SE] Sweden .................................. 9602589
Jun. 30, 1997 [WO] WIPO ...................... PCT/SE97/01176

[51] Int. Cl.[7] .................................................. F02B 33/00
[52] U.S. Cl. ...................................... 123/559.1; 60/605.1
[58] Field of Search ........................ 123/559.1; 60/605.1, 60/280

[56] References Cited

U.S. PATENT DOCUMENTS

| | | |
|---|---|---|
| 3,113,561 | 12/1963 | Heintz . |
| 3,418,986 | 12/1968 | Scherenberg .......................... 123/559.1 |
| 4,928,648 | 5/1990 | Schatz et al. . |
| 5,746,172 | 5/1998 | Peschka et al. ....................... 123/559.1 |

FOREIGN PATENT DOCUMENTS 0060802   9/1982   European Pat. Off. .
2278640  12/1994   United Kingdom .

*Primary Examiner*—John Kwon
*Attorney, Agent, or Firm*—Birch, Stewart, Kolasch & Birch, LLP

[57] ABSTRACT

An internal combustion engine includes at least one cylinder, a piston reciprocating in the cylinder, and a combustion chamber defined by the piston and the cylinder. The cylinder has an intake for supplying a mixture of air and fuel to the combustion chamber and an exhaust for releasing exhaust gases from the combustion chamber. An intake valve is operatively positioned in the intake, and an exhaust valve is operatively positioned in the exhaust. A compressor is designed to pressurize the air, and a fuel means is adapted to supply fuel. The device further includes a pressure-regulating member connected to the exhaust, and a dosing member connected to the intake and is adapted to determine, in coaction with the pressure-regulating member, the amount of fresh mixture of fuel and air in relation to the amount of retained exhaust gases in the combustion chamber.

10 Claims, 3 Drawing Sheets

ENGINE

FIELD OF THE INVENTION

The present invention relates to an internal combustion engine of the type having a reciprocating piston in a cylinder with a combustion chamber of variable volume being defined by the piston and the cylinder.

BACKGROUND ART

Today's internal combustion engines all suffer from low efficiency. Various experiments have been made to increase the efficiency. For instance, lighter materials have been developed and the friction has been reduced by taking various measures. This has resulted in a certain increase in efficiency. Since it has been considered impossible to significantly improve the efficiency, the development has been concentrated on an increase of the power in relation to the cylinder volume.

Decisive factors, however, are the ratio of compression and how well the thermal energy is recovered before the combustion chamber opens to the exhaust side. However, the ratio of compression is limited by the fact that the pressure that is being built up in the combustion chamber of the cylinder during the compression phase is not allowed to be too high, since the mixture of air and fuel that is compressed in advance then ignites spontaneously. The leaner the mixture, i.e. the larger the amount of air in relation to the amount of fuel, the higher compression can be used, but instead one reaches a point where the mixture will be difficult to ignite. For the engine to smoothly operate in a wide load range, a compromise must be chosen, which at present means that the efficiency is slightly more than 35%.

With respect to recovering the thermal energy, a constant problem is that the entire combustion chamber is ventilated after each combustion. It is impossible to completely burn, during all load cases, all fuel in the entire combustion chamber. Therefore, a greater or smaller part of unburnt fuel will be released together with the exhaust gases. This problem is particularly evident in two-stroke engines. Furthermore, part of the thermal energy is used to eject the exhaust gases through the exhaust.

In particular for two-stroke engines, merely a small amount is converted into kinetic energy, while the major part escapes together with the exhaust gases. This depends on the combustion occurring merely during about a quarter of a crankshaft revolution. Subsequently use is made of the excess pressure produced by the combustion in the combustion chamber in order to eject the exhaust gases and simultaneously take in a new volume of fuel and air. The new volume is compressed during the latter part of the revolution so as to be ignited at, or in practice a certain angle before, 360/0 degrees. The best combustion which is possible to achieve by this mode of operation is achieved at fairly high speeds/high load. Particularly during idling and at lower speeds, a very incomplete combustion takes place and, thus, the thermal energy is utilised to an unsatisfactory extent.

Experiments have been made to provide an internal combustion engine which better utilises the thermal energy by a more complete combustion, as disclosed in U.S. Pat. No. 3,113,561. This patent specification discloses a stratified charge two-cycle engine, in which the amount of fuel-air mixture supplied to the combustion chamber is controlled. What one wants to achieve is to retain, during low-power operation, part of the exhaust gases in the combustion chamber to make them participate in a plurality of combustion cycles and be burnt more completely. At the same time, only part of the combustion chamber is filled with fresh fuel-air mixture, and one tries to prevent the exhaust gases and the fuel-air mixture from mixing with each other. In order to accomplish this, each cylinder has been provided with two intakes, a first intake through which merely air is supplied and a second intake through which a mixture of air and fuel is supplied. To each intake are connected a compressor and a spill valve such that the charging pressure can be controlled individually. The first intake is arranged in the lower part of the cylinder wall, practically just opposite an exhaust gas outlet, and the second intake is arranged in the top of the cylinder. The second intake is opened/closed by means of a valve. In addition to the conventional combustion chamber, two extra chambers are arranged in the upper part of the cylinder, after the valve. In case of a low power output, the first spill valve is completely open and the second is almost completely open. The mixture fills only part of the extra chambers, in which ignition takes place. The remaining part of the combustion chamber is filled with exhaust gases, which participate in the combustion. If a higher power output is required, first the second spill valve is progressively closed, then the first spill valve, which means that a smaller and smaller part of the combustion chamber is occupied by exhaust gases. Obvious drawbacks of this solution is the doubling of the components on the intake side. Moreover, the air supplied via the first intake will entrain the exhaust gases which are closest to the piston and which are least burnt through the exhaust which is located just opposite, which in a wide intermediate power range considerably reduces the advantages of the construction.

SUMMARY OF THE INVENTION

The object of the present invention is to provide an internal combustion engine which has higher efficiency, lower fuel consumption and less emissions of noxious substances than prior art internal combustion engines.

In the internal combustion engine according to the invention, the coaction between the dosing means and the pressure-regulating means makes it possible to accurately control how great part of the internal combustion chamber is filled with fresh fuel-air mixture during the period when the intake valve is open. The actual pressure in the moment of ignition is controllable thanks to the fact that the counter-pressure on the exhaust side and the filling pressure on the intake side are controllable. Besides, the pressure is controllable to a level, at which spontaneous ignition would occur in a conventional internal combustion engine. The reason for this is that the retained exhaust gases are poor in oxygen.

BRIEF DESCRIPTION OF THE DRAWINGS

The invention will now be described in more detail by way of embodiments and with reference to the accompanying drawings, in which.

FIG. is a schematic cross-sectional view of the composition of a dosing means and a pressure-regulating means according to an embodiment of the invention.

DESCRIPTION OF A PREFERRED EMBODIMENT

The engine according to the invention operates according to a completely new principle, which is called three-stroke. A combustion cycle consists of a power stroke, a gas-exchange stroke and a compression stroke, and the combustion cycle is passed during one revolution of the crankshaft. Moreover, the engine operates according to a pressure principle, in which the air-fuel mixture is actively pressed or supplied into the combustion chamber of the cylinder. This is in contrast to today's internal combustion engines, which use the motion of the piston to produce suction in the intake to suck in the mixture and also to eject the exhaust gases.

Figure 1:
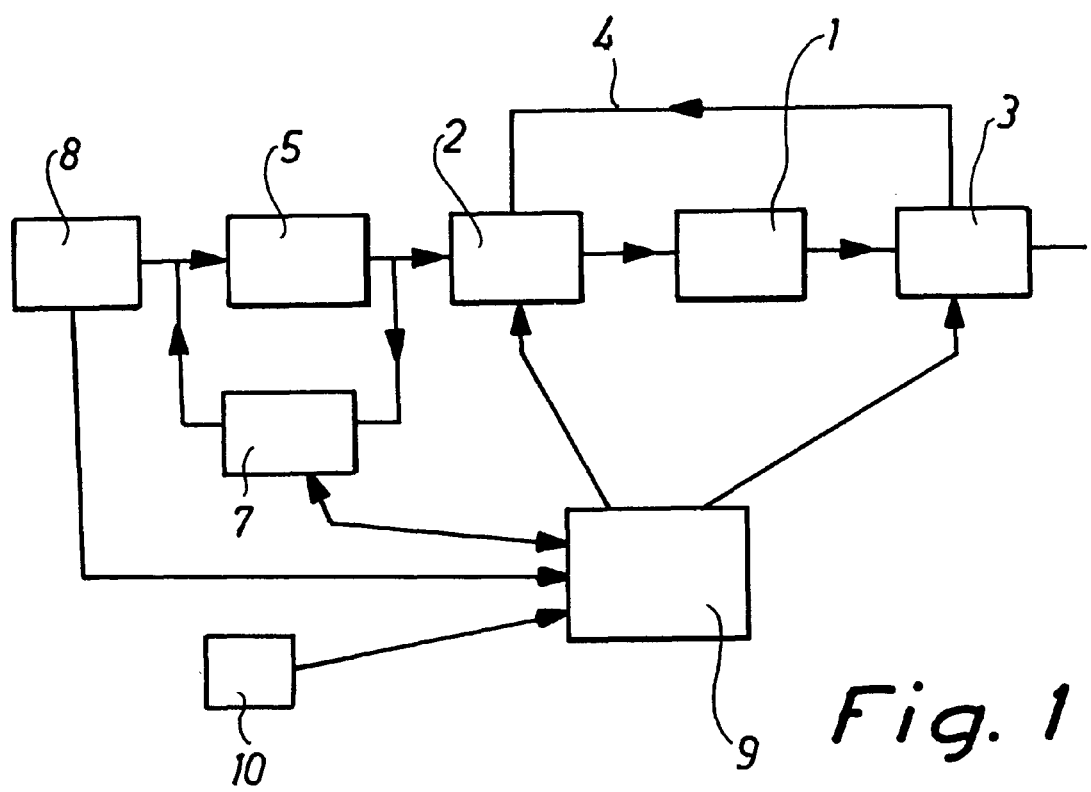
FIG. 1 is a block diagram of the composition of an engine according to an embodiment of the invention.

FIG. 1 is a block diagram of a preferred embodiment of an internal combustion engine according to the present invention. Now assume for the sake of simplicity that the engine has one cylinder. This is designated 1. On the intake side, the engine is provided with a dosing means 2. On the exhaust side, the engine is provided with a pressure-regulating means 3, below called pressure regulator 3. The pressure regulator is connected to the dosing means 2 via a conduit 4. Moreover, a compressor 5 is connected to the dosing means 2. Over the compressor 5, a bypass means 7, also called bypass regulator, is connected. An airflow sensor 8 is connected to the air intake side of the compressor 5. A control unit 9 is connected to, inter alia, the pressure regulator 3, the dosing means 2, the bypass means 7, the air flow sensor 8 and a throttle lever 10.

Figure 2:
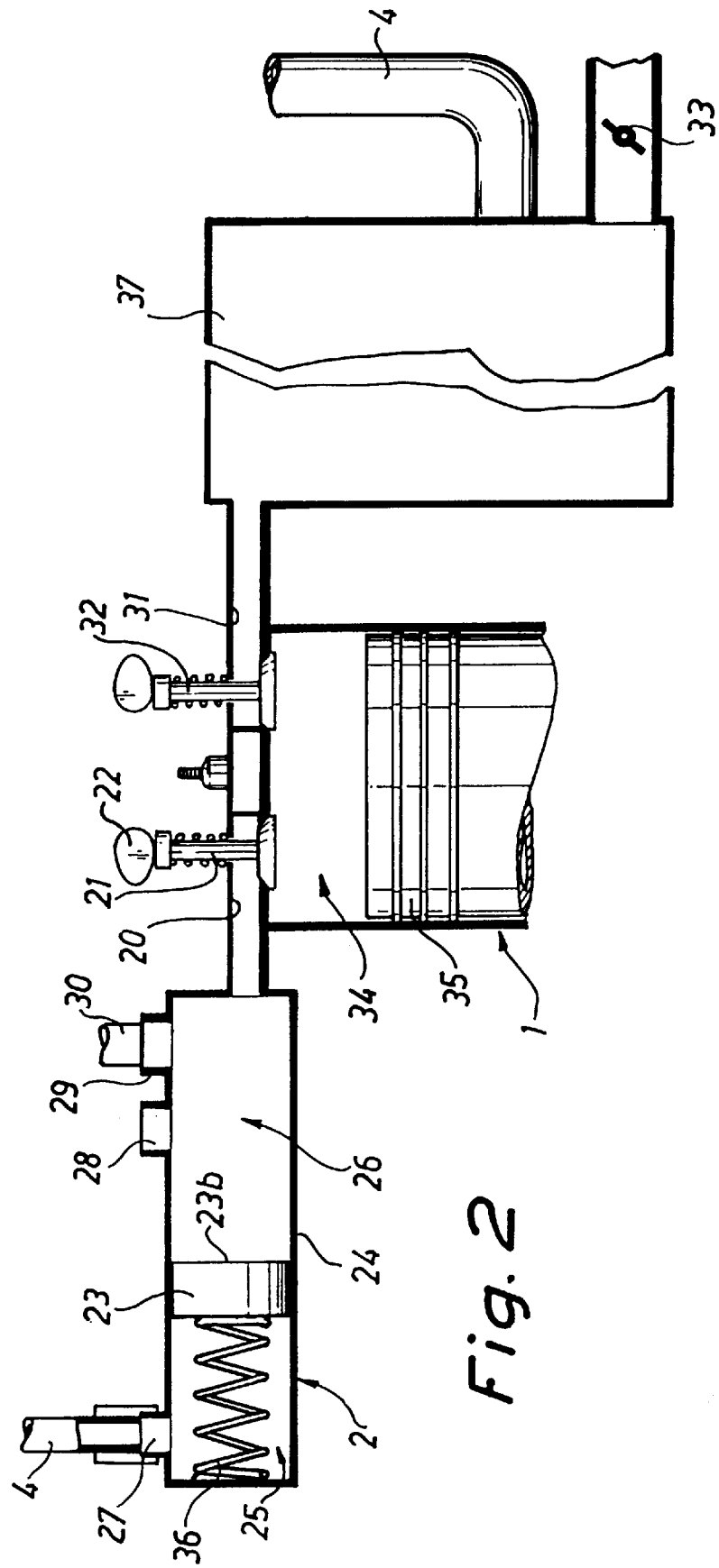

FIG. 2 shows most schematically the essential composition of the dosing means 2, the cylinder 1 and the pressure regulator 3. The dosing means 2 is connected to the intake 20 of the cylinder 1, in which intake an intake or injection valve 21 is arranged. The injection valve 21 is operated in conventional manner by means of some sort of camshaft 22. The dosing means 2 consists of a piston-and-cylinder assembly, the dosing piston 23 having a first pressure side 23a, which together with the dosing cylinder 24 defines a first chamber 25, and a second opposite pressure side 23b, which together with the dosing cylinder 24 defines a second chamber 26. In the first chamber 25, a returning means, in this embodiment a spring 36, is arranged. Its function will be apparent in the following. The resilience is preferably adjustable. The conduit 4 and, thus, the pressure regulator 3, is connected to a first dosing intake 27 of the first chamber 25. The compressor 5 is connected to a second dosing intake 28 of the second chamber 26. A fuel supply means 30, below called fuel injection means, is connected to a third dosing intake 29 of the second chamber 26. An exhaust 31 is arranged on the exhaust side of the engine, and an exhaust or ejection valve 32 is arranged in the exhaust 31. The exhaust 31 is connected to an adjustable throttle valve 33 of the pressure regulator 3, preferably via an expansion vessel 37 included in the pressure regulator 3. The conduit 4 extends from the expansion vessel 37. The cylinder 1 of the engine accommodates a reciprocating piston 35, which together with the cylinder 1 defines a combustion chamber 34. It is understood that the piston 35, via a connecting rod, is connected to a crankshaft, and therefore these components are not shown.

The internal combustion engine preferably operates essentially in the following manner. Each of the above-mentioned three strokes occupies, roughly seen, a third of a revolution of the crankshaft. During the gas-exchange stroke, the piston 35 moves around its bottom position and the volume of the combustion chamber 34 changes to a comparatively small extent. For the gas exchange, the motion of the piston 34 is not utilised, but instead a fresh fuel-air mixture is passed (injected) into the combustion chamber 34 under pressure through the injection valve 21 and at the same time ejects exhaust gases through the ejection valve 35. The regulation of the relationship between the pressures on the intake and exhaust sides is important for the invention and will be discussed in more detail below.

Now starting from a state in which prevails equilibrium between the forces acting on the two pressure sides 23a and 23b of the dosing piston 23. This does not necessarily mean that the same pressure prevails in the chambers 25, 26. On the contrary, there is normally a difference in pressure. The dosing piston 23 is designed such that power equilibrium is achieved at a suitable pressure ratio, for instance 1:2, 1:3 or some other convenient ratio. However, the pressure is preferably selected such that the pressure is always higher in the second chamber 26 than in the first chamber 25.

The fuel injection means 30 is of conventional type and supplies fuel to the second chamber 26 during short periods. The control unit 9 controls the fuel injection means 30, i.e. the duration of each period, with the aid of information supplied by the air flow sensor 8. The throttle lever 10 controls, via the control unit 9, the bypass means 7 for adjusting the pressure in the second chamber 26. The pressure in the second chamber 26 is the pressure for injecting into the combustion chamber 34 of the cylinder 1. These events can be said to be a first step in the adaptation of the conditions in the combustion chamber to the power requirement at issue. A second step is the adjustment of the counterpressure, i.e., the pressure on the exhaust side, which is regulated by the pressure regulator 3. The regulator 3 is controlled by the control unit 9.

Now assuming that the power requirement increases (the driver steps on the gas). The means 7 is then actuated by the control unit 9 such that the flow decreases, i.e. the flow of air in the second chamber 26 increases, which leads to a pressure increase therein. At the same time, the control unit 9 actuates the pressure regulator 3 such that the throttle valve 33 opens more and, thus, decreases the pressure in the first chamber 25 via the conduit 4. As a result, the pressure equilibrium changes and the volume of the second chamber 26 increases, during compression of the spring 36, until a new equilibrium has set at a higher pressure in the second chamber 26 and a changed pressure relationship between the chambers 25 and 26. This makes it possible to inject a larger amount of air into the combustion chamber 34 during the gas exchange phase. Further the control unit 9 senses an increased air supply and extends the period for the fuel injection.

Let us study the actual gas exchange in more detail. At the end of the working stroke, when the expansive force has subsided to a considerable extent and the pressure in the combustion chamber has fallen, the ejection valve 32 opens. In the ideal case, the entire amount of thermal energy from the combustion has been converted into piston motion. However, this would mean that the temperature of the exhaust gases would be the same as the temperature of the injection air. In practice, this is not quite the case. The pressure in the combustion chamber 34 is therefore higher than after the valve 32 when this is being opened. The pressure wave produced in the context does not, however, reach the first chamber 25 via the conduit 4 but subsides in the expansion vessel 37. Then the injection valve 21 opens. The size of the volume of the combustion chamber 34 that is ventilated is now dependent on the pressure and the volume in the second chamber 26 in relation to the counterpressure on the exhaust gas side. The pressure in the second chamber 26 is always at least the same as the counterpressure. A fresh air-fuel mixture is injected into the combustion chamber 34 and at the same time exhaust gases are ejected from the combustion chamber 34. The pressure in the second chamber 26 falls and when it has reached the same level as the counterpressure, the gas exchange ceases. The ejection valve 32 closes and just after that, also the injection valve 21 closes. The exhaust gas volume that remains in the combustion chamber 34 is involved in the subsequent compression and working strokes. With a view to achieving a well-controlled regulation of the size of the part of the combustion chamber that is ventilated during each gas exchange, some sort of throttling is arranged adjacent to the second dosing intake 28. This can be achieved, for instance, by arranging a needle valve adjacent to the intake 28 or by designing the intake as a plurality of successively arranged, narrow nozzles, of which a certain number are covered by the dosing piston 23 in a starting position and of which more and more are uncovered, the further to the left in FIG. 2 the dosing piston 23 moves. The throttling is adapted to the fact that the second chamber is charged during about ⅔ of each combustion cycle.

Figure 3A:
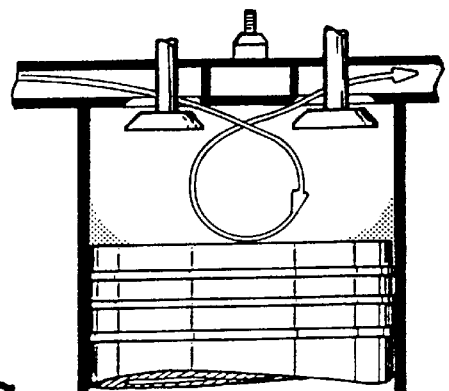
FIGS. 3a–c schematically illustrate the situation in the combustion chamber under different operating conditions.

If the power requirement is at its maximum, the pressure regulator 3 is set such that the throttle valve 33 opens completely and the second chamber 26 is given the largest possible volume such that practically the entire combustion chamber 34 is ventilated. This results in the situation shown in FIG. 3a. Preferably, the exhaust gases which are closest to the edge of the piston 35 and which are shaded in FIG. 3a, are not released, since they always contain some unburnt fuel.

Figure 3B:
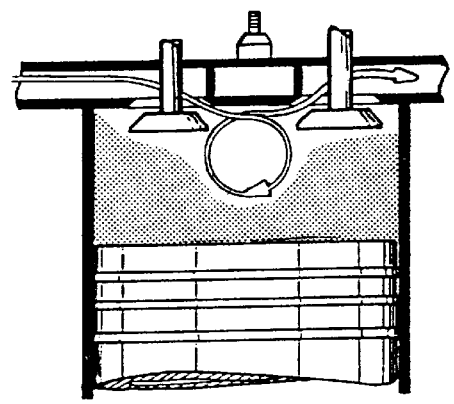

FIG. 3b shows the situation when the power requirement is smaller. The pressure regulator 3 now builds up a higher counterpressure. As a result, a smaller amount of fresh mixture is injected into the combustion chamber 34 and a larger amount of exhaust gases remains.

Figure 3C:
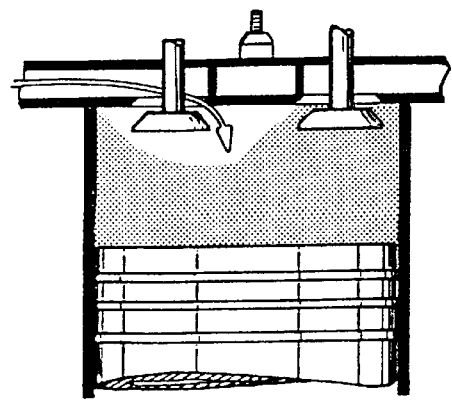

In the situation in FIG. 3c, the requirement is small, for instance during idling. The counterpressure is high in relation to the pressure in the second chamber 26, and only a very restricted amount of fresh mixture is supplied to the combustion chamber 34.

To make the path of the gas flow through the combustion chamber 34 during the gas-exchange stroke favourable, it is important that the intakes and exhausts 20, 31 are designed such that they control the gas in a suitable fashion. Moreover, the arrangement of the injection and ejection valves 21, 32 is very important. They must not be arranged such that the fresh mixture is blown straight towards the exhaust 31.

The arrangement of the spark plugs should preferably be made such that the ignition occurs where the fresh gas first urges away the exhaust gases, or in the vicinity thereof, in order that very small amounts of fresh mixture will certainly be ignited.

Two effects of the described composition of the engine and its mode of operation are that the compression pressure is variable, i.e. adjustable according to the operation conditions in each moment, and that the compression pressure can be set considerably higher than in prior art engines. This depends on the fact that only part of the combustion chamber is supplied with a fresh mixture. The high amount of non-oxidizable gases in the exhaust gases that are retained dampens the tendencies toward spontaneous ignition of the fresh mixture. Besides, this can be kept comparatively lean. The compression pressure is determined mainly by the pressure regulator 3. A maximum compression pressure is desirable for the purpose of achieving the optimum effect also of a most limited amount of fresh mixture.

ALTERNATIVE EMBODIMENTS

The embodiment described above is but an example of how the device according to the invention can be designed, and modifications are feasible within the scope of the invention as defined in the appended claims.

The returning means, the purpose of which is to return the dosing piston 23 to a starting position when the engine is shut off, and to provide a preferably progressive counter force against the force, with which the pressure in the second chamber acts on the dosing piston 23 to make it possible to achieve power equilibrium under different pressure conditions, may instead be, for instance, a damping piston which dampens more, the more the dosing piston 23 is moved to the left in FIG. 2, or some other means having the same function.

The throttle valve 33 can be of any type whatever.

The expansion vessel is not quite necessary, but instead a multiple coupling can be arranged between the exhaust 31, the throttle valve 33 and the conduit 4, in combination with some sort of valve, for instance a throttle valve, in the conduit 4.

What is claimed is:

1. An internal combustion engine comprising:
   at least one cylinder;
   a piston reciprocably mounted within the cylinder;
   a combustion chamber defined by a space formed by the piston and the cylinder;
   an intake operatively positioned in the cylinder for supplying a mixture of air and fuel to the combustion chamber;
   an exhaust operatively positioned in the cylinder for releasing exhaust gases from the combustion chamber;
   an intake valve operatively positioned in connection with the intake;
   an exhaust valve operatively positioned in connection with the exhaust;
   a compressor for pressurizing air supplied to said cylinder; and
   a fuel means for supplying fuel comprising:
   a pressure-regulating means operatively connected to the exhaust; and
   a dosing means operatively connected to the intake and adapted to determine, in coaction with the pressure-regulating means, the amount of fresh mixture of fuel and air in relation to the amount of retained exhaust gases in the combustion chamber.

2. The internal combustion chamber according to claim 1, wherein the dosing means is a piston and cylinder assembly comprising a dosing piston and a dosing cylinder enclosing the same, that the dosing piston includes a first pressure side and together with the dosing cylinder defines a first chamber and a second opposite pressure side together with the cylinder defines a second chamber, said pressure-regulating means being connected to the first chamber and said compressor and said fuel means being connected to the second chamber with the second chamber being connected to the intake.

3. The internal combustion engine according to claim 2, wherein the dosing means comprises a returning means connected to the dosing piston for operatively imparting motion thereto.

4. The internal combustion engine according to claim 3, wherein the pressure-regulating means comprises an expansion vessel connected to the exhaust.

5. The internal combustion engine according to claim 3, wherein the pressure-regulating means comprises a throttle valve for controlling the pressure in the exhaust.

6. The internal combustion engine according to claim 2, wherein the pressure-regulating means comprises an expansion vessel connected to the exhaust.

7. The internal combustion engine according to claim 2, wherein the pressure-regulating means comprises a throttle valve for controlling the pressure in the exhaust.

8. The internal combustion engine according to claim 1, wherein the pressure-regulating means comprises an expansion vessel connected to the exhaust.

9. The internal combustion engine according to claim 8, wherein the pressure-regulating means comprises a throttle valve for controlling the pressure in the exhaust.

10. The internal combustion engine according to claim 1, wherein the pressure-regulating means comprises a throttle valve for controlling the pressure in the exhaust.

* * * * *